United States Patent

Kimura et al.

Patent Number: 5,700,381
Date of Patent: Dec. 23, 1997

[54] METHOD FOR MANUFACTURING THIN FILM MAGNETIC HEAD

[75] Inventors: Fujimi Kimura, Kitasaku-gun; Toyoaki Tanaka, Saku; Akihiko Dobashi, Saku; Takashi Abe, Saku, all of Japan

[73] Assignee: TDK Corporation, Tokyo, Japan

[21] Appl. No.: 526,498

[22] Filed: Sep. 7, 1995

[51] Int. Cl.⁶ ............................................ B44C 1/22
[52] U.S. Cl. ............................................ 216/22; 216/41
[58] Field of Search .................. 216/22, 41, 51, 216/101; 29/603

[56] References Cited

U.S. PATENT DOCUMENTS 4,878,290  11/1989  Masud et al.
5,326,429  7/1994  Cohen et al. .................. 216/22

FOREIGN PATENT DOCUMENTS 60-193114  10/1985  Japan.
62-229512  10/1987  Japan.
1-211311   8/1989   Japan.

Primary Examiner—William Powell
Attorney, Agent, or Firm—Oblon, Spivak, McClelland, Maier & Neustadt, P.C.

[57] ABSTRACT

After applying a metal film on a surface of a substrate, the metal film is patterned in such a manner that the surface of the substrate is exposed in a pattern that corresponds to the pattern of the required indented portion. Then, the substrate is immersed in an etchant which etches the substrate selectively to form the indented portion in the surface of the substrate using the metal film as a mask.

The method makes it possible to define the depth and the pattern of an indented portion where a magnetic transducer is provided with a high degree of accuracy, to prevent a reduction in pattern accuracy due to re-adhering and to advance industrial productivity.

4 Claims, 3 Drawing Sheets

METHOD FOR MANUFACTURING THIN FILM MAGNETIC HEAD

BACKGROUND OF THE INVENTION

1. Field of the Invention

The present invention relates to a method for manufacturing a thin film magnetic head.

2. Discussion of Background

Thin film magnetic heads with a magnetic transducer formed on an indented portion provided in one surface of a substrate, and methods for forming such an indented portion already exist in the prior art. Japanese Unexamined Patent Publication (KOKAI) No. 193114/1985, for instance, discloses a means for forming an indented portion through machining that employs a blade, and Japanese Unexamined Patent Publication (KOKAI) No. 211311/1989, discloses a technology with which, after a resist is applied to a substrate, the substrate is heated so that the resist flows, then, using the resist as a mask, the substrate is etched using ion beam etching or with an etching solution that is a mixture of HF and $HNO_3$ to form an indented portion.

When providing an indented portion on one surface of a substrate, since the depth of the indented portion and the pattern accuracy bear directly on the characteristics of the magnetic transducer to be formed on it, it is extremely important to assure that the depth can be controlled and that the pattern of the indented portion can be accurately defined with high accuracy. It is also crucial that splashes, which may be generated from the substrate while the indented portion is being formed, are reliably prevented from re-adhering, so that no reduction in the pattern accuracy due to re-adhering occurs. In addition, when one considers the aspect of industrial productivity, high etching rate in formation of the indented portion is essential.

However, the prior art technologies mentioned above do not sufficiently meet these requirements. For instance, the art disclosed in Japanese Unexamined Patent Publication (KOKAI) No. 193114/1985 employs machining with which it is difficult to control the depth of the indented portion to the degree of accuracy required for this type of technology. As for the technology disclosed in Japanese Unexamined Patent Publication (KOKAI) No. 211311/1989, since the patterning mask is structured with a resist, a pattern form defect can easily occur. The technology also presents problems in that, since the indented portion is formed through ion beam etching, pattern accuracy tends to be reduced, pattern form defects tend to occur due to re-adhering and also in that the etching rate is low.

SUMMARY OF THE INVENTION

It is an object of the present invention to provide a method for manufacturing a thin film magnetic head with which the depth of the indented portion on which the magnetic transducer is provided can be reliably controlled.

It is a further object of the present invention to provide a method for manufacturing a thin film magnetic head that makes it possible to define the pattern of the indented portion with a high degree of accuracy.

It is a still further object of the present invention to provide a method for manufacturing a thin film magnetic head which ensures that no reduction in pattern accuracy due to re-adhering occurs.

It is a still further object of the present invention to provide a method for manufacturing a thin film magnetic head that advances industrial productivity.

In order to achieve the objects described above, in manufacturing a thin film magnetic head with a magnetic transducer or a component thereof formed on an indented portion which is provided in one surface of a substrate, the present invention comprises the first and second processes described below.

In the first process, after applying a metal film onto a surface of the substrate, the metal film is patterned in such a manner that the surface of the substrate will be exposed in a pattern corresponding to the pattern of the required indented portion.

In the second process, which follows the first process, the substrate is immersed in an etching solution that will etch the substrate selectively, and the indented portion is formed in the surface of the substrate with the metal film as a mask.

Since, in the second process, the substrate is immersed in an etching solution that will selectively etch the substrate but not the metal film that has been created in the first process, and an indented portion is formed in the surface of the substrate using the metal film as a mask, the depth and inclination of the indented portion where the magnetic transducer or a component thereof, i.e., a read portion, or a pattern for preventing electrostatic breakdown are located, can be reliably controlled by controlling the temperature, composition and the like of the etching solution.

Since the metal film, which is patterned in such a manner that the surface of the substrate will be exposed in a pattern corresponding to the pattern of the required indented portion after applying it to the surface of the substrate in the first process, is used as a mask, compared to the prior art technology, which uses a resist pattern mask, the pattern of the indented portion can be defined with a higher degree of accuracy. In addition, because of the characteristics of the metal film described above, the depth and inclination of the indented portion can be controlled over a wide range while maintaining a high degree of accuracy.

Since the pattern of the indented portion is formed through wet etching using an etchant, unlike patterns formed through dry etching, including ion beam etching, no reduction in pattern accuracy due to re-adhering occurs.

Furthermore, since the pattern of the indented portion is formed through wet etching using an etchant, the etching rate is higher by a factor of 10 or more than that of dry etching, including ion beam etching.

In addition, this makes batch production and the like possible, and industrial productivity is greatly improved.

BRIEF DESCRIPTION OF THE DRAWINGS

These and other advantages, features and objects of the present invention will be understood by those of ordinary skill in the art referring to the annexed drawings, given purely by way of non-limitative example, in which.

DETAILED DESCRIPTION OF THE PREFERRED EMBODIMENTS

Figure 1:
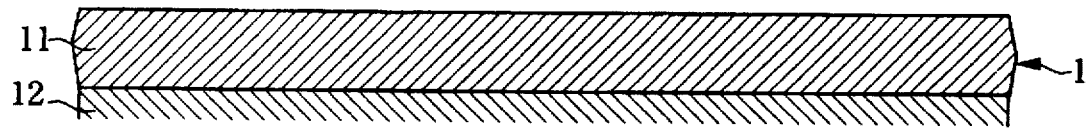
FIG. 1 illustrates a manufacturing process for a thin film magnetic head according to the present invention.

FIGS. 1 to 10 sequentially illustrate the manufacturing processes for a thin film magnetic head according to the present invention. In order to manufacture a thin film magnetic head with a magnetic transducer formed on an indented portion which is provided in one surface of a substrate, the method includes a first process and a second process. The indented portion may be provided not exclusively to accommodate the magnetic transducer itself but to accommodate, for instance, the read portion thereof or a pattern for preventing electrostatic breakdown. The first process is illustrated in FIGS. 1 to 6 and includes a step in which, after applying a metal film onto a surface of the substrate, the metal film is patterned in such a manner that the surface of the substrate will be exposed in a pattern corresponding to the pattern of the required indented portion. First, a substrate 1 is prepared, as shown in FIG. 1. The surface layer 11 of the substrate 1 is constituted of a metallic oxide ceramic material such as $Al_2O_3$ or $SiO_2$.

The substrate 1 will normally be a wafer and have a structure in which the surface layer 11 mentioned earlier is laminated on a base body 12, constituted of $Al_2O_3$—TiC. The surface layer 11 has a film thickness of, for instance, 5 µm to 20 µm.

Figure 2:
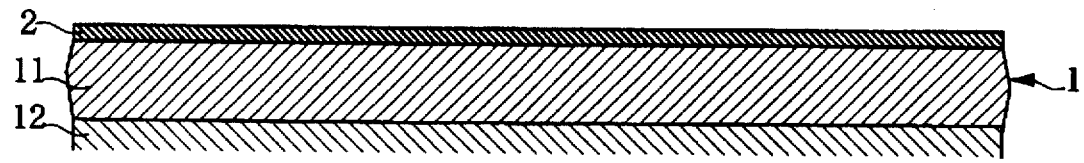
FIG. 2 illustrates a manufacturing process that follows the manufacturing process in FIG. 1.

Next, as shown in FIG. 2, a metal film 2 is adhered on to a surface of the surface layer 11 of the substrate 1. The metal film 2 may be constituted of, for instance, titanium or a permalloy. Such a metal film 2 can be formed by sputtering, deposition, plating or by a combination of these methods. If plating is used, the method does not have to be limited to electroplating but electroless plating may be used.

Figure 3:
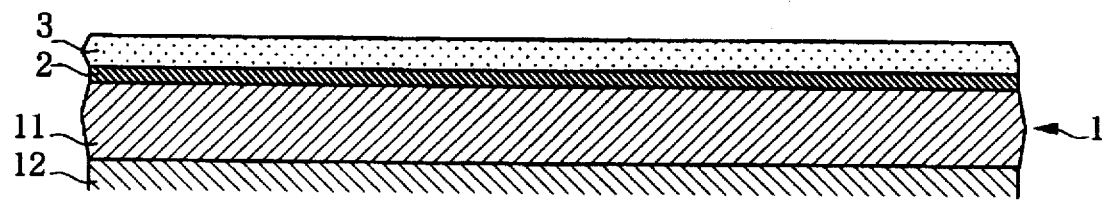
FIG. 3 illustrates a manufacturing process that follows the manufacturing process in FIG. 2.

Then, as shown in FIG. 3, a photosensitive resist film 3 is adhered to the surface of the metal film 2. The resist film 3 may be either the negative or positive type and a wide variety of photosensitive resists of the known art may be used.

The adhering process can be carried out by using the spincoat method or the like.

Figure 4:
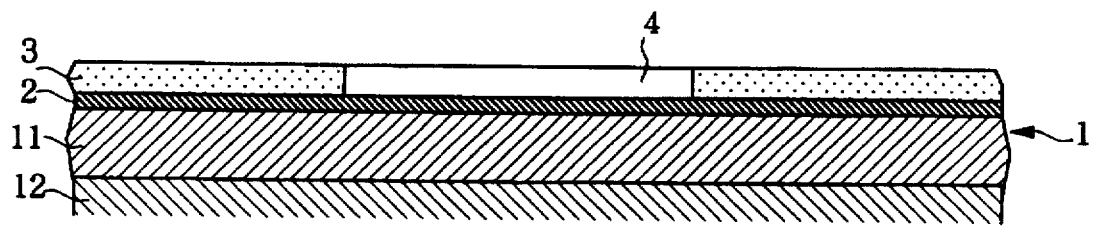
FIG. 4 illustrates a manufacturing process that follows the manufacturing process in FIG. 3.

Next, through a photo lithography process, the resist film 3 is exposed and developed to form a pattern 4 which corresponds to the required pattern of the indented portion, as shown in FIG. 4. The metal film 2 is exposed on the inside of the pattern 4.

Figure 5:
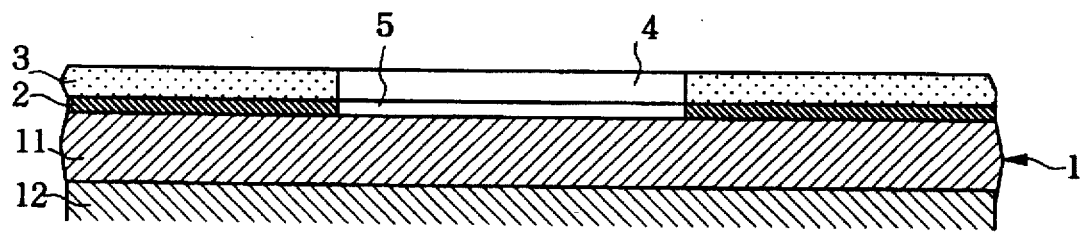
FIG. 5 illustrates a manufacturing process that follows the manufacturing process in FIG. 4.

Then, as shown in FIG. 5, the metal film 2 inside the pattern 4, which is enclosed by the photosensitive resist film 3, is etched along the pattern 4 and, with this, a pattern 5 for exposing the surface of the substrate 1 is formed. The metal film 2 can be patterned either through dry etching, such as ion beam etching or through wet etching, with a chemical etchant. It is desirable to perform wet etching if the advantage of high etching rate is required.

Figure 6:
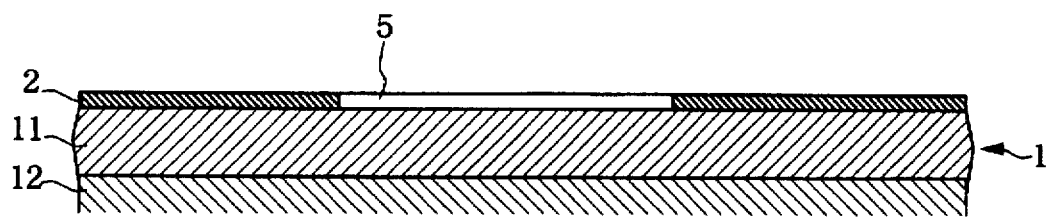
FIG. 6 illustrates a manufacturing process that follows the manufacturing process in FIG. 5.

After this, by using a solvent which suits the selected photosensitive resist film 3, the photosensitive resist film 3 is removed, as shown in FIG. 6.

Figure 7:
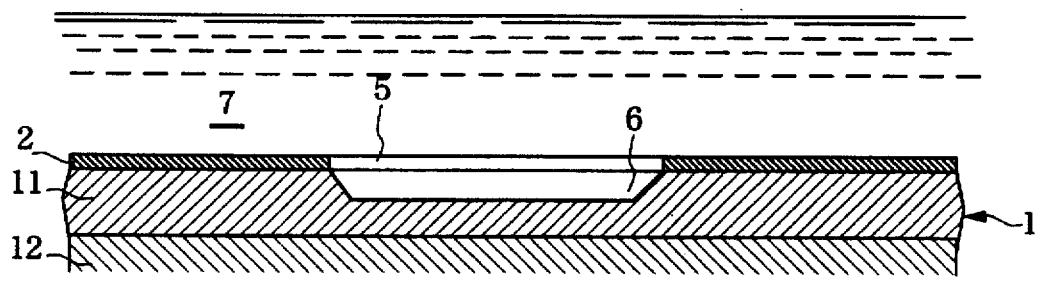
FIG. 7 illustrates a manufacturing process that follows the manufacturing process in FIG. 6.

The second process, which is illustrated in FIGS. 7 to 10, includes a step in which, following the first process described above, the substrate 1 is immersed in an etchant that selectively etches only the substrate 1, not the metal film 2, thereby forming an indented portion 6 in the surface of the substrate 1. In other words, as shown in FIG. 7, the substrate 1, which is provided with the pattern 5 by the metal film 2, is immersed in an etchant 7, which selectively etches the substrate 1 and not the metal film 2. This immersion, with the metal film 2 acting as a mask, forms the indented portion 6, which conforms to the pattern 5.

The depth d of the indented portion 6 may be, for instance, several µm. The etchant 7 may be either an alkali or an acid. The etchant 7 which is suited to the surface layer 11 of the substrate 1 where the indented portion 6 is to be formed, which is, as described earlier, constituted of a metallic oxide ceramic material such as $Al_2O_3$ or $SiO_2$, may be a $Ca(OH)_2$ solution, a KOH solution, and NaOH solution or the like.

Since, in the second process, the substrate 1 is immersed in the etchant 7, which selectively etches only the substrate 1 and not the metal film 2 that was provided in the first process, to form the indented portion 6 in the surface of the substrate 1 by using the metal film 2 as a mask, the depth d of the indented portion 6 where the magnetic transducer is to be provided can be reliably controlled by controlling the temperature, the composition and the like of the etchant 7.

Figure 11:
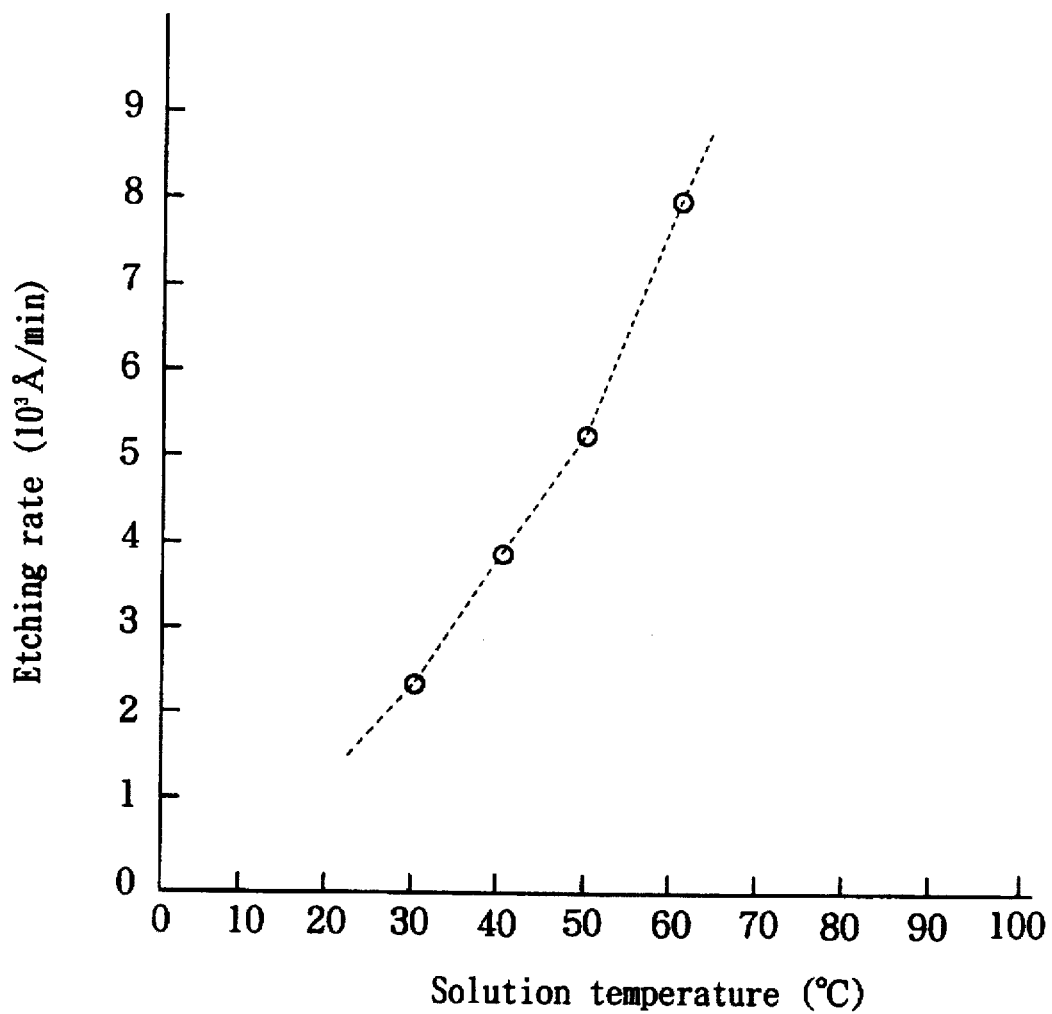
FIG. 11 shows the relationship between the solution temperature and the etching rate.

FIG. 11 shows the relationship between the solution temperature and the etching rate when a solution with the composition described earlier is used as the etchant 7. As FIG. 11 clearly shows, the etching rate increases as the solution temperature increases.

Therefore, by controlling the temperature of the solution, the etching depth per unit time can be controlled. Thus, by controlling the duration of etching, the quantity of etching can be controlled.

Furthermore, since the metal film 2 is patterned in such a manner that the surface of the substrate 1 will be exposed in a pattern corresponding to the pattern of the required indented portion after adhering the metal film to one surface of the substrate 1 in the first process, the pattern of the required indented portion 6 can be defined with a higher degree of accuracy than can be achieved with the prior art technology, which uses a resist pattern mask. This is because, when the metal film 2 is used, the reduction of the pattern accuracy which occurs during the wet etching process can be checked, compared to a case in which a resist mask is used. In addition, because of the characteristics of the metal film 2 described above, the depth and inclination of the indented portion 6 can be controlled.

Moreover, since the pattern of the required indented portion 6 is formed through wet etching with the etchant 7, unlike patterns formed through dry etching, including ion beam etching, no reduction in pattern accuracy due to re-adhering occurs.

Furthermore, the etching rate in wet etching which uses an etchant is at least ten times greater than in dry etching, such as ion beam etching. In addition, this method makes batch production and the like possible, and industrial productivity is greatly improved.

The inclination of the internal side surface 61 of the indented portion 6 formed through etching as described earlier, should be set within the range of 5° to 90°, preferably within the range of 45° to 75° in order to obtain desirable magnetic circuit characteristics when adhering a portion of the magnetic core of the magnetic transducer in the indented portion 6. When forming a lower magnetic film with a portion of the magnetic core inside the indented portion 6, by imparting an angle to the internal side surface 61, the restriction of the front end portion becomes steep, which in turn reduces the leak magnetic field while achieving a strong write magnetic field. This makes high density recording possible. The inclination range of 45° to 75° mentioned earlier is particularly desirable since this range reduces the leak magnetic field, fortifies the write magnetic field and also facilitates patterning in the inclined portion. The inclination can be adjusted by controlling the etching rate.

Figure 8:
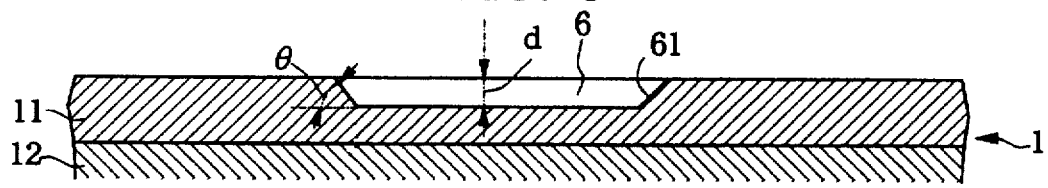
FIG. 8 illustrates a manufacturing process that follows the manufacturing process in FIG. 7.
Figure 9:
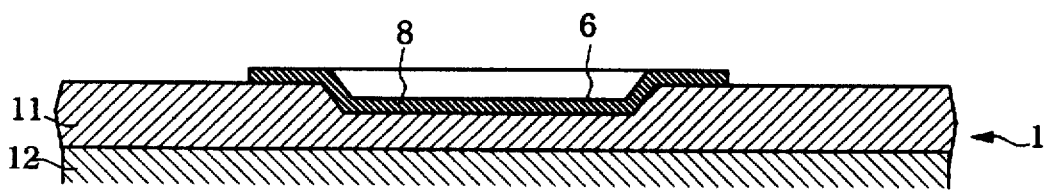
FIG. 9 illustrates a manufacturing process that follows the manufacturing process in FIG. 8.
Figure 10:
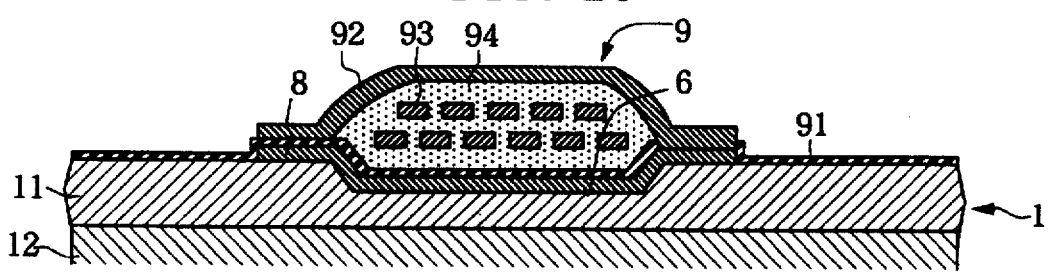
FIG. 10 illustrates a manufacturing process that follows the manufacturing process in FIG. 9.

Then, after the metal film 2 is removed, as shown in FIG. 8, a lower magnetic film 8 that constitutes a part of the magnetic core of the magnetic transducer is formed, extending from the inside of the indented portion 6 through the surface of the substrate 1 surrounding the indented portion 6, as shown in FIG. 9. Next, as shown in FIG. 10, the magnetic transducer 9 is formed on top of the lower magnetic film 8. The structure of the magnetic transducer 9 is of the known art. FIG. 10 shows an inductive type magnetic transducer as a specific example, which is provided with a gap film 91, an upper magnetic film 92 which forms a pair with the lower magnetic film 8, a coil film 93 and a coil layer insulating film 94.

Although not shown in the figures, the present invention can be widely applied as a means for forming other indented portions for accommodating part of or the entirety of a magnetic transducer.

What is claimed is:

1. A method for manufacturing a thin film magnetic head with a magnetic transducer or a component thereof on an indented portion provided in one surface of a substrate, the method comprising the steps of:

applying a metal film to the surface of said substrate;

patterning said metal film in such a manner that said surface of said substrate will be exposed in a pattern corresponding to a pattern of said indented portion; and immersing said substrate in an etching solution that etches said substrate selectively to form said indented portion in said surface with said metal film as a mask;

wherein:
        an internal side surface of said indented portion is a bevelled surface with an inclination of 5° to 90°.

2. A method for manufacturing a thin film magnetic head according to claim 1, wherein:

said substrate is constituted of a metallic oxide ceramic material.

3. A method for manufacturing a thin film magnetic head according to claim 1, wherein:

said metal film is patterned through chemical etching.

4. A method for manufacturing a thin film magnetic head according to claim 1, wherein:

said magnetic transducer is an inductive type element that includes a magnetic core, a coil film and a gap film with a portion of said magnetic core adhering to an inside of said indented portion.

* * * * *